United States Patent [19]

Dumbaugh, Jr.

[11] 3,769,047

[45] Oct. 30, 1973

[54] METHOD OF DEPRESSING THE LIQUIDUS TEMPERATURE OF LANTHANUM ALUMINOGERMANATE GLASSES, AND THE GLASSES PRODUCED

[75] Inventor: William H. Dumbaugh, Jr., Painted Post, N.Y.

[73] Assignee: Corning Glass Works, Corning, N.Y.

[22] Filed: Apr. 27, 1971

[21] Appl. No.: 137,856

[52] U.S. Cl.......... 106/47 Q, 106/47 R, 250/83.3 H
[51] Int. Cl............................ C03c 3/12, C03c 3/24
[58] Field of Search......................... 106/47 R, 47 Q

[56] References Cited
UNITED STATES PATENTS

| 3,029,152 | 4/1962 | Milne et al........................ | 106/47 Q |
| 2,691,599 | 10/1954 | Blan................................. | 106/47 R |

*Primary Examiner*—Leland A. Sebastian
*Attorney*—Clarence R. Patty, Jr. and Clinton S. Janes, Jr.

[57] ABSTRACT

The liquidus temperature of a lanthanum aluminogermanate glass is depressed by incorporating a selected additive in the glass batch. This produces a family of lanthanum aluminogermanate glasses composed essentially, in percent by weight on an oxide basis, of 25–50 percent $GeO_2$, 1.5–25 percent $Al_2O_3$, 15–40 percent $La_2O_3$ and 2.5–45 percent of one or more oxides selected from the group $Nb_2O_5$, $Ta_2O_5$, SrO, BaO, PbO, and ZnO. These glasses have a substantial transmission for radiation in the five to six micron wavelength range, are hard and abrasion resistant, and have moderate coefficients of thermal expansion and good glassworking properties. They are particularly adapted to use as windows in infrared detection systems.

3 Claims, 1 Drawing Figure

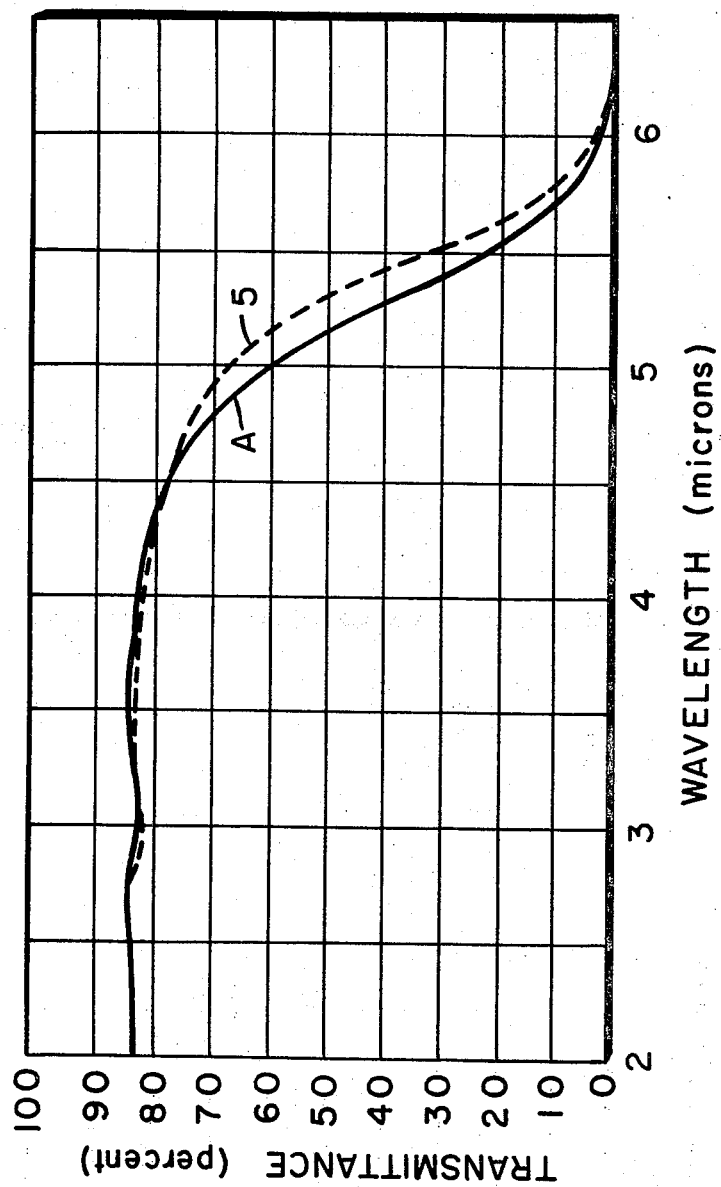

METHOD OF DEPRESSING THE LIQUIDUS TEMPERATURE OF LANTHANUM ALUMINOGERMANATE GLASSES, AND THE GLASSES PRODUCED

This invention relates to the modification of lanthanum aluminogermanate glasses to depress the glass liquidus temperature, and to the infrared transmitting glasses thus produced.

There has been a continuing interest for many years in the development of glasses having improved transmission characteristics in the infrared portion of the spectrum. A primary concern has been extension of the transmission cutoff point or line to longer wavelengths. In recent years, the application of these glasses in missile systems has introduced additional requirements, in particular resistance to erosion by rain and other atmospheric particles and resistance to heat shock.

Initial needs in the field of infrared transmitting glasses were met with silicate glasses. U.S. Pat. No. 3,531,306 granted in my name on Sept. 29, 1970, discloses such infrared transmitting silicate type glasses. Characteristically, the transmission cutoff in these glasses occurs within the wavelength range of 4 to 5 microns.

In recent years, a need has developed for glasses which transmit well at longer wavelengths, in particular within the wavelength range of 5 to 5.5 microns. The inability of silicate glasses to meet this need, and the consequent development of a family of calcium aluminogermanate glasses, are described in U.S. Pat. No. 3,531,305 also granted in my name on Sept. 29, 1970.

The infrared transmission chacteristics of the glasses described in this latter patent are substantially improved over those of known silicate glasses. Nevertheless, there has been a continuing desire to further improve and extend transmission, particularly within the 5 to 5.5 micron range. Also, the unexpected abrasive effect of rain and other atmospheric particles on missile glass components has created a need to provide harder, more abrasion resistant glasses than the calcium aluminogermanate glasses. It is, of course, desirable to achieve these improvements while maintaining other properties such as moderate coefficient of thermal expansion, resistance to devitrification, and otherwise good glassworking characteristics.

The problem of improved infrared transmission in glasses has also been addressed in U.S. Pat. No. 3,119,703 which was granted to Cleek et al. on Jan. 28, 1964 and which discloses a family of $BaO-TiO_2-GeO_2$ glasses. The coefficients of thermal expansion of these glasses are generally above $80 \times 10^{-7}$, and therefore undesirably high. Also such glasses may not be adequately hard for certain needs.

A companion application, Ser. No. 137,855, filed of even date herewith in my name, discloses a family of infrared transmitting glasses containing substantial amounts of tantala ($Ta_2O_5$) and zinc oxide (ZnO). The invention of that application is based on my discoveries that lanthanum germanate type glasses have excellent infrared transmission characteristics, and that a combination of $Ta_2O_5$ and ZnO will stabilize a lanthanum germanate melt without seriously depressing this desirable infrared transmission.

It has been found that alumina ($Al_2O_3$) will also stabilize lanthanum germanate melts and provide a family of lanthanum aluminogermanate glasses. I have found that the resulting glasses provide a substantial transmission of infrared radiation in the 5 to 6 micron wavelength range. However, they tend to have very high liquidus temperatures in the range of 1,300°–1,400°C. Accordingly, while such a glass can be melted, it is extremely difficult to cool the melt from the molten state and subject it to any kind of molding or shaping operation without severe devitrification occurring.

I have now discovered that this problem of high liquidus temperature, and consequent devitrification, can be solved by incorporating one or more selected additives in the composition of the lanthanum aluminogermanate base glass.

The present invention then is based on my discoveries that lanthanum aluminogermanate glasses are effective infrared transmitting glasses, and that the devitrification tendencies of these glasses can be controlled by incorporating in the glass one or more of a selected group of oxide additives.

A basic purpose of the present invention is to stabilize lanthanum germanate melts with alumina, and to depress the devitrification tendencies of the resulting lanthanum aluminogermanate glasses. A further purpose is to provide glasses that possess good infrared transmission and physical hardness characteristics. Another purpose is to provide glasses that combine these properties with a moderate coefficient of thermal expansion and good glassworking characteristics.

The invention then resides in a method of depressing the liquidus temperature of a lanthanum aluminogermanate glass by adding to the batch from which the glass is melted materials which incorporate into the glass one or more oxides selected from the group consisting of $Nb_2O_5$, $Ta_2O_5$, SrO, BaO, PbO, and ZnO, in an amount totalling 2.5–45 percent of the glass composition. This produces an infrared transmitting glass consisting essentially, in percent by weight as calculated on an oxide basis from the glass batch, of 25–50 percent $GeO_2$, 1.5–25 percent $Al_2O_3$ 15–40 percent $La_2O_3$, and 2.5–45 percent of one or more oxides selected from the group consisting of $Nb_2O_5$, $Ta_2O_5$, SrO, BaO, PbO, and ZnO. Incidental amounts of other oxides may be present to the extent that they do not unduly influence the basic glass properties. In general, such other glass constituents serve no useful purpose and their intentional addition is avoided except as needed in glass melting or minor physical property adjustment.

Germania ($GeO_2$) is the primary glass forming oxide in the present glasses, and at least 25 percent is required for that purpose. The rather strong devitrification tendencies of the present glasses are lessened with increased $GeO_2$ contents. However, infrared transmission, particularly the location of the cutoff in the five to six micron range, generally improves as the $GeO_2$ content decreases. Therefore, the $GeO_2$ level selected for a given glass will generally represent a compromise between infrared transmission and glassworking properties. In no case should the $GeO_2$ level exceed 50 percent.

Frequently, during working of low germania content glasses, devitrification will occur, but will be restricted to the glass surface. In that case, it may be possible to remove this defect by grinding and polishing the finished product. In this manner, germania contents in the lower part of the range may be employed.

At least 15 percent lanthana ($La_2O_3$) is necessary to provide a hard, abrasion resistant glass. This component also improves the infrared transmission and extends the cutoff within the five to six micron range so that a content over 20 percent is preferred. Up to 40 percent of this oxide may be present before melting problems, particularly devitrification, become intolerable.

Other oxides, such as baria (BaO) and calcia (CaO), are known to improve infrared transmission in germanate glasses. However, I have found that a lanthana glass provides a significantly superior transmission with respect to a corresponding calcia glass, while generally also providing a substantially lower liquidus temperature. Lanthana tends to increase the coefficient of thermal expansion of a germanate glass, but an equivalent amount of BaO tends to impart a much greater increase. Further, lanthana improves the chemical stability of a glass.

Alumina ($Al_2O_3$) tends to stabilize, both chemically and physically, a lanthanum germanate glass. At least 1.5 percent $Al_2O_3$ must be present in the glass composition for this purpose.

It has been found, however, that the resulting $La_2O_3$-$Al_2O_3$-$GeO_2$ glasses have very high liquidus values, generally in the range of 1,300°–1,400°C. Therefore, such glasses have a very strong tendency to devitrify as they cool and/or during subsequent forming operations.

I have found that several oxides are capable of lowering the liquidus temperature markedly in these glasses, thereby inhibiting the devitrification tendencies. These include the oxides of niobium, tantalum, strontium, barium, lead and zinc. At least 2.5 percent of one or more of these oxides is required for this purpose. However, glass melting may become more difficult with increasing contents of these oxides, and their total content should not exceed 45 percent for this reason.

In general other glass constituents provide no benefits in accordance with the invention, and may actually depress the desirable characteristics of the glasses. Accordingly, they are normally avoided except as incidental impurities or as minor additives in amounts up to 5 percent or so for such purposes as physical property adjustment and fining. Thus, titania ($TiO_2$) has little adverse effect on expansion or liquidus and may aid in melting or viscosity adjustment. However, glass forming oxides other than $GeO_2$, particularly boric oxide ($B_2O_3$), may sharply depress transmission and are avoided.

In general, the present glasses may be melted in conventional manner from ordinary glassmaking materials and worked in any customary manner. However, it is usually desirable to employ relatively pure raw materials in oxide form, and to melt the glasses in small, electrically heated, melting units.

The drying procedure described in U.S. Pat. No. 3,531,271 granted in my name on Sept. 29, 1970 may be employed. Briefly, this comprises adding a glass component to the batch in chloride form and melting the batch with a dry gas passing over the melt.

The invention is further described and illustrated with reference to the following table which sets forth, in percent by weight on an oxide basis, the compositions of several glasses produced in accordance with the invention. Also set forth in the table are certain properties measured on the glasses, including (1) percent transmittance measured at wavelengths of 5 microns (%$T_5$) and 5.5 microns (%$T_{5.5}$) on a two mm. thick glass sample in a Perkin-Elmer Model 221 Infrared Spectrophotometer, (2) thermal expansion coefficient (Exp.) in units/°C. $\times 10^{-7}$ as measured between 25° and 300°C., and (3) liquidus temperature (Liq.) in °C.

TABLE I

| | 1 | 2 | 3 | 4 | 5 | 6 |
|---|---|---|---|---|---|---|
| $GeO_2$ | 42.3 | 42.6 | 37.9 | 31.7 | 36.6 | 39.3 |
| $Al_2O_3$ | 9.2 | 6.2 | 6.2 | 3.9 | 5.9 | 8.5 |
| $La_2O_3$ | 36.6 | 33.2 | 32.8 | 24.7 | 31.7 | 27.2 |
| $Nb_2O_5$ | 11.9 | | 5.3 | | | |
| $Ta_2O_5$ | | 18.0 | 17.8 | 33.5 | 17.2 | 18.5 |
| BaO | | | | | | 6.4 |
| PbO | | | | | 8.7 | |
| ZnO | | | | 6.2 | | |
| Percent $T_5$ | 62 | 63 | 59 | 61 | 65 | 64 |
| Percent $T_{5.5}$ | 22 | 26 | 23 | 26.5 | 32 | 29 |
| Exp | 64.5 | 63 | 62.8 | 58.6 | 65.8 | 62.7 |
| Liq | 1290 | 1207 | 1196 | | 1242 | 1266 |
| $GeO_2$ | 47.0 | 40 | 35.6 | 45.8 | 45 | 27.6 |
| $Al_2O_3$ | 15.3 | 5 | 10.9 | 14.9 | 12.2 | 1.7 |
| $La_2O_3$ | 32.6 | 20 | 34.7 | 31.7 | 39 | 26.9 |
| $Nb_2O_5$ | | 7 | | | | |
| $Ta_2O_5$ | | 7 | 18.8 | | | 43.8 |
| BaO | | 7 | | 7.6 | | |
| PbO | | 7 | | | | |
| SrO | 5.2 | 7 | | | | |
| ZnO | | | | | 3.9 | |
| Percent $T_5$ | 59 | 53 | 63 | 59 | 58 | 60 |
| Percent $T_{5.5}$ | 24 | 23.5 | 26 | 24 | 23 | 25 |
| Exp | 63.9 | 73.7 | 61.1 | 63.2 | 60.9 | 58.0 |
| Liq | 1277 | | 1289 | 1288 | 1279 | |

A half-pound glass batch, corresponding to each of the above compositions, was prepared by weighing oxide batch materials to the nearest 0.1 gram and mixing thoroughly. The mixed batch was placed in a platinum crucible and melted in an electrical resistance furnace for 2 hours at 1,500°C. The melt was cast to form a 2 inch $\times$ 4½ inch slab, and this was annealed by cooling slowly from about 760°C. to room temperature.

The above melting procedure might be modified by including a small amount of a chloride material in the glass batch. For example, the CaO component of Example 4 might be introduced into the glass batch as calcium chloride ($CaCl_2$). Also, the melting procedure might be modified by blowing a dry gas, such as nitrogen, over the crucible during melting. In this manner, a "dry" glass would be produced in accordance with the teaching in my earlier patent.

By way of specifically illustrating a particular feature of the present invention, a glass having the composition of Example 5 in the table above is compared with a present commercial infrared transmitting glass designated A. The latter glass has a coefficient of thermal expansion of 62.6 $\times 10^{-7}$/°C., a liquidus temperature of 1,324°C., and is composed of 43.2 percent $GeO_2$, 5.1 percent ZnO, 23.7 percent $Al_2O_3$, 13.8 percent CaO, 9.7 percent BaO, 4.4 percent Cl.

A two (2) mm. thick sample of each glass was prepared and percent transmission measurements at wavelengths over the range of 2.0–6.0 microns were made on the spectrophotometer identified above. The curves plotted from these data are shown in the appended drawing which is a graphical illustration wherein percent transmittance is plotted on the vertical axis and wavelength on the horizontal axis. It is apparent that the glass of the present invention provides a substantial improvement in transmission in the 5.0-6.0 micron portion of the spectrum, as well as a substantially lower liquidus value.

The effect of the selected additive oxides in reducing liquidus temperature may be seen in the following table wherein three glass compositions are presented in mole percent for convenience in comparison. The liquidus temperature for each corresponding glass is also set forth in the table.

TABLE II

|  | A | B | C |
|---|---|---|---|
| $GeO_2$ | 44 | 45 | 45 |
| $Al_2O_3$ | 30 | 15 | 25 |
| $La_2O_3$ | 25 | 25 | 25 |
| $Nb_2O_5$ | — | 5 | — |
| $Ta_2O_5$ | — | 10 | 5 |
| Liq. | 1350 | 1196 | 1270 |

It will be noted that the substitution of 5 mole percent $Ta_2O_5$ for $Al_2O_3$ (compare glasses A and C) lowers the liquidus temperature by 80°C. The substitution of 15 mole percent of additives in glass B has the even more dramatic effect of lowering the liquidus temperature by 150°C. to below 1,200°C.

I claim:

1. A method of depressing the liquidus temperature of a lanthanum aluminogermanate glass which includes adding to the batch from which the glass is melted materials which incorporate into the glass one or more oxides selected from the group consisting of $Nb_2O_5$, $Ta_2O_5$, SrO, BaO, PbO and ZnO in an amount totalling 2.5–45 percent of the glass composition.

2. An infrared transmitting glass consisting essentially, in percent by weight as calculated on an oxide basis from the glass batch, of 25–50 percent $GeO_2$, 1.5–25 percent $Al_2O_3$, 15–40 percent $La_2O_3$ and 2.5–45 percent of one or more oxides selected from the group consisting of $Nb_2O_5$, $Ta_2O_5$, SrO, BaO, PbO, and ZnO.

3. An infrared transmitting glass in accordance with claim 2 wherein the $La_2O_3$ content is at least 20 percent.

* * * * *